United States Patent
Dong et al.

(10) Patent No.: US 6,463,103 B1
(45) Date of Patent: Oct. 8, 2002

(54) FRAME-BASED SIGN INVERSION METHOD AND SYSTEM FOR SPECTRAL SHAPING FOR PULSE-CODED-MODULATION MODEMS

(75) Inventors: Ping Dong, Cupertino, CA (US); Kuo-Yu Lin, San Jose, CA (US)

(73) Assignee: ESS Technology, Inc., Fremont, CA (US)

(*) Notice: Subject to any disclaimer, the term of this patent is extended or adjusted under 35 U.S.C. 154(b) by 0 days.

(21) Appl. No.: 09/657,769

(22) Filed: Sep. 8, 2000

Related U.S. Application Data

(63) Continuation of application No. 09/008,101, filed on Jan. 16, 1998, now Pat. No. 6,343,101.

(51) Int. Cl.[7] .............................................. H04B 14/04
(52) U.S. Cl. ...................................................... 375/242
(58) Field of Search ................................. 375/242, 245, 375/249, 295, 265, 259, 222, 363; 714/746, 755, 757, 759, 764, 766, 775, 776, 798; 370/350, 512, 529; 704/212, 221

(56) References Cited

U.S. PATENT DOCUMENTS

| | | | | |
|---|---|---|---|---|
| 5,546,461 A | * | 8/1996 | Ibaraki et al. | 380/10 |
| 5,943,365 A | * | 8/1999 | Long et al. | 375/222 |
| 6,026,124 A | * | 2/2000 | Lee et al. | 372/292 |
| 6,134,242 A | * | 10/2000 | Aftelak | 370/465 |
| 6,255,967 B1 | * | 7/2001 | Norrell et al. | 341/58 |
| 6,256,347 B1 | * | 7/2001 | Yu et al. | 375/240.13 |
| 6,304,990 B1 | * | 10/2001 | Shikakura et al. | 714/747 |
| RE37,507 E | * | 1/2002 | Jung | 341/63 |
| 6,343,101 B1 | * | 1/2002 | Dong et al. | 375/242 |

* cited by examiner

Primary Examiner—Jean Corrielus
Assistant Examiner—Emmanuel Bayard
(74) Attorney, Agent, or Firm—Stevens & Westberg, LLP

(57) ABSTRACT

A spectral shaping PCM modem communication system uses a symbol encoder to encode a data bit stream into a PCM symbol stream. A plurality of different frames are formed from the PCM symbol stream. Performance metrics are computed for each possible frame and its inversion so a decision can be made in order to select a most desirable frame and inversion Delays are injected in the data flow to allow a look-ahead and thus provide for better frame selection and inversion decisions. A channel multiplexer combines decision bits and output frames to form encoded output frames that are fed to a digital channel connected to a telephone network wherein they are converted to analog signal. A corresponding decoder converts analog signals from the telephone network to digital signals. A timing recovery and equalization means corrects sample timing and removes inter-symbol interference effects introduced by telephone networks. The output of the equalizer is sampled at correct timing to recover the received samples and received frame. A channel de-multiplexer separates the frame selection and frame inversion decision bits from the symbol frames received. Inversion and framing decisions are discerned from the demultiplexed frame selection and frame inversion decision bits. Original PCM symbol frames are reconstructed and PCM symbols are decoded into a data bit stream. A non-negative shell mapping may be used as the symbol encoder. A decoder checks to see if a currently received frame is negative. If it is, then all samples in such current frame are inverted. Otherwise, all samples in the current frame are unchanged. The resulting frames are then forwarded to a non-negative shell mapping decoder for eventual reconversion to digital data.

27 Claims, 3 Drawing Sheets

FRAME-BASED SIGN INVERSION METHOD AND SYSTEM FOR SPECTRAL SHAPING FOR PULSE-CODED-MODULATION MODEMS

This is a continuation of Ser. No. 09/008,101, filed Jan. 16, 1998, now U.S. Pat. No. 6,343,101 entitled FRAME-BASED SIGN INVERSION METHOD AND SYSTEM FOR SPECTRAL SHAPING FOR PULSE-CODED-MODULATION MODEMS.

FIELD OF THE INVENTION

The present invention relates generally to data modems, and more particularly to pulse coded modulation modems which operate at rates as high as 56K bits-per-second.

DESCRIPTION OF THE PRIOR ART

The next generation in modem technology operates at a 56K bit-per-second (KBPS) data rate. Computer users are expected to aggressively seek upgrades that provide ever faster access to the Internet. Pulse code modulation (PCM) 56K BPS modems are now expected to flood the personal computer (PC) market faster than any previous generation.

Historically, telephone networks were intended to carry analog voice traffic. Therefore, equipment was designed to create, transmit, and process analog signals. As computer and digital transmission technologies have advanced, nearly all equipment installed now in new facilities is digital.

Almost every long distance telephone communication now uses digital transmission on the majority of their lines, because it offers better transmission quality. But since voice in its natural form is analog, it is necessary to convert these. In order to transmit analog signals over digital facilities, to capitalize on its numerous advantages, analog signals are converted to digital signals.

PCM is a conversion process typically used by coder/decoder (codec) devices. PCM is a method of converting analog signals into binary ones and zeroes suitable for digital transmission. At the receiving end of such digital transmissions, the digitally coded signals are reconverted into the kind of analog signals that sound like voices to the listener.

PCM uses a three-step process that begins with sampling. The analog voltage levels in the voice signals are sampled at discrete time intervals, according to Nyist's Theorem. If an analog signal is sampled at twice the rate of the highest frequency it attains, the reproduced signal will be a highly accurate reproduction of the original.

The highest frequency used in voice communications is 4000 Hz, so a signal sampled 8000 times per second, will preserve the voice quality of the speaker such that a listener will be unaware of the digital sampling in between.

The next step is quantizing. Since analog signals are continuous, an infinite number of voltage levels are needed to perfectly describe any analog signal. In practice, each analog sample is rounded to the nearest of 256 predetermined voltage levels by quantizing. Quantizing assigns one of 256 amplitude levels to each sample. The amplitudes of samples do not all exactly match their original, but are close enough so only a small quantizing error occurs that can create an audible noise over the transmission line.

Low-amplitude signals are more affected by quantizing error than are high-amplitude signals, so a method called companding is used. Companding reduces the effects of quantizing errors on the lower amplitude signals where the effects are greatest. This is paid for by increasing the error on high amplitude signals where the quantizing errors effect is minimal. But even with companding, the sampling rate remains the same at about 8K samples per second.

Two common companding formulas are used in different parts of the world. The United States and Japan use a companding formula called Mu-law ($\mu$-law). In Europe, and other areas of the world, the so-called A-law is used. Although the two appear to differ only slightly, they are nevertheless incompatible, e.g., $\mu$-law hardware cannot be mixed in use with A-law hardware.

Encoding is the third step and converts each of the 256 possible numeric amplitude voltage levels into a corresponding binary 8-bit digital code, e.g., the final PCM ready for digital transmission.

At the receiver, the transmitted digital bit stream must be converted back to an analog waveform, in order to be recognized as a voice to the listener. Such digital-to-analog conversion (DAC) is essentially the reverse of PCM, and involves decoding, reconstruction, and filtering.

Decoding converts the 8-bit PCM code into PAM voltage levels. Reconstruction reads the converted voltage level and reproduces the original analog signal. The decoding process creates unwanted audible high frequency noise in the 4000–8000 Hz range. So a low-pass filter is needed to block the frequencies higher than one-half the sampling rate, e.g., 4000 Hz.

A PCM modem transmitter transmits user data bits by encoding them into PCM code symbols. These PCM code symbols are fed into a digital network channel. The digital network channel carries these PCM code symbols to a site near the end user where they are converted into analog waveforms as if they are voice samples. These analog waveforms reach a user's site through a physical communication channel. At the user's site, a PCM modem receiver processes these waveforms to recover the PCM code symbols transmitted from the PCM modem transmitter. These recovered PCM code symbols are then decoded to recover user data bits.

A physical communication channel usually does not transfer signals at different frequencies equally well. For example, some communication channels have a DC block capacitor or transformer, therefore they cannot pass the DC component of the signals. Yet, some other communication channels have band limitation, therefore they cannot pass a signal component above a certain frequency. For all these communication channels, some kind of spectral shaping is normally required on the transmitted modem signal to use a better part of the channel in order to improve the modem performance.

A conventional way to do spectral shaping is through modulation and pulse shaping filtering, e.g., using a modulating carrier to shift the signal spectrum to a desired frequency band and using a filter to define the bandwidth and shape of the transmitted signal spectrum.

The modulation and filter approach may not always be feasible or desirable, such as in the case of a PCM modem. For a PCM data stream sampled at 8000 Hz, a minimum of 4000 Hz bandwidth (Nyquist rate) is needed. Since the telephone channel bandwidth itself is only 4000 Hz, no bandwidth margin can exist.

In almost every modem it is advantageous to avoid sending low frequency signals near DC, because such signals tend to suffer more from distortion and interference because of the non-linear way that transformers operate and power lines interfere. Such low frequency signals also cannot pass through transformers in the hybrid or the subscriber line card at the central office.

One way to measure the amount of the DC component in the transmitted sample stream is through the use of a running-digital-sum ("RDS"). For a given sample in a PCM sample sequence, the running-digital-sum is defined as the algebraic sum of all samples up to and including that sample.

Several methods recently suggested for DC-suppression in a PCM modem all use sample inversion. Such methods first group PCM code stream samples into segments of equal length, and then inverts selected ones of the PCM codes to balance the DC component on-the-fly. Information about which particular PCM codes are inverted is appended to the user data for the receiver use during decoding. The receiver uses the inversion flag information to recover the original polarity of each PCM code. Including such overhead data for the inversion information erodes the maximum user data rates possible.

In one prior art method, a fixed sample in each segment, such as the first sample in each segment, is selectively inverted to balance out DC. In another prior art method, a best sample in a segment is selected, and selectively inverted to balance out DC. In yet another prior art method, the sample with maximum magnitude is selectively inverted to balance out DC. All prior art methods allow trade off between the amount of redundancy and spectral shaping capability.

In such prior art sample inversion methods, at least one redundant bit is required to flag the inversion of each sample in a segment. More redundant bits are needed when the inverted-sample locations in a segment must be pointed to. So it is highly desirable to use schemes that minimize such redundancy while still maximizing the spectral shaping capability.

Prior art spectral shaping methods universally include a predefined measure on how good a particular sequence is with a measure such as "running-digital-sum" for a sequence. Such spectral shaping methods try to define a correction random variable that improves the "running-digital-sum" measure of the output sequence. How well a DC-suppression method works largely depends on the quality of the correction random variable used, so the major difference between prior art spectral shaping methods is in the selection of correction random variable.

A good correction random variable should have a large dynamic range and fine granularity to allow adequate and accurate correction. Sample-based prior art methods use individual samples per frame as the correction random variable.

SUMMARY OF THE INVENTION

It is therefore an object of the present invention to provide a frame-based inversion methodology for desired spectral shaping in PCM modem communication systems.

Briefly, a method embodiment of the present invention for spectral shaping in PCM modem communication systems comprises a frame-based spectral shaping method. An encoded PCM symbol stream is used by a framing operation to form several different frame types. A metric computation mechanism measures the spectral shaping performance of the different types of frames and their inversions by computing the performance metrics. Based on the computed performance metrics, a decision mechanism is included to select a best frame type and whether or not to invert the frame type. It is possible to introduce a delay mechanism which delays the decision of frame selection and inversion decision to optimize the spectral shaping performance by looking ahead more frames. Finally, an inversion mechanism inverts the selected frame type following the decision instruction to produce an output frame.

An advantage of the present invention is that a frame-based spectral shaping method is provided that uses random variables derived from a group of samples as the correction random variable. For a given amount of redundancy, larger dynamic ranges and smaller granularity are made possible.

These and other objects and advantages of the present invention will no doubt become obvious to those of ordinary skill in the art after having read the following detailed description of the preferred embodiments which are illustrated in the drawing figures.

IN THE DRAWINGS

DETAILED DESCRIPTION OF THE PREFERRED EMBODIMENT

Figure 1:
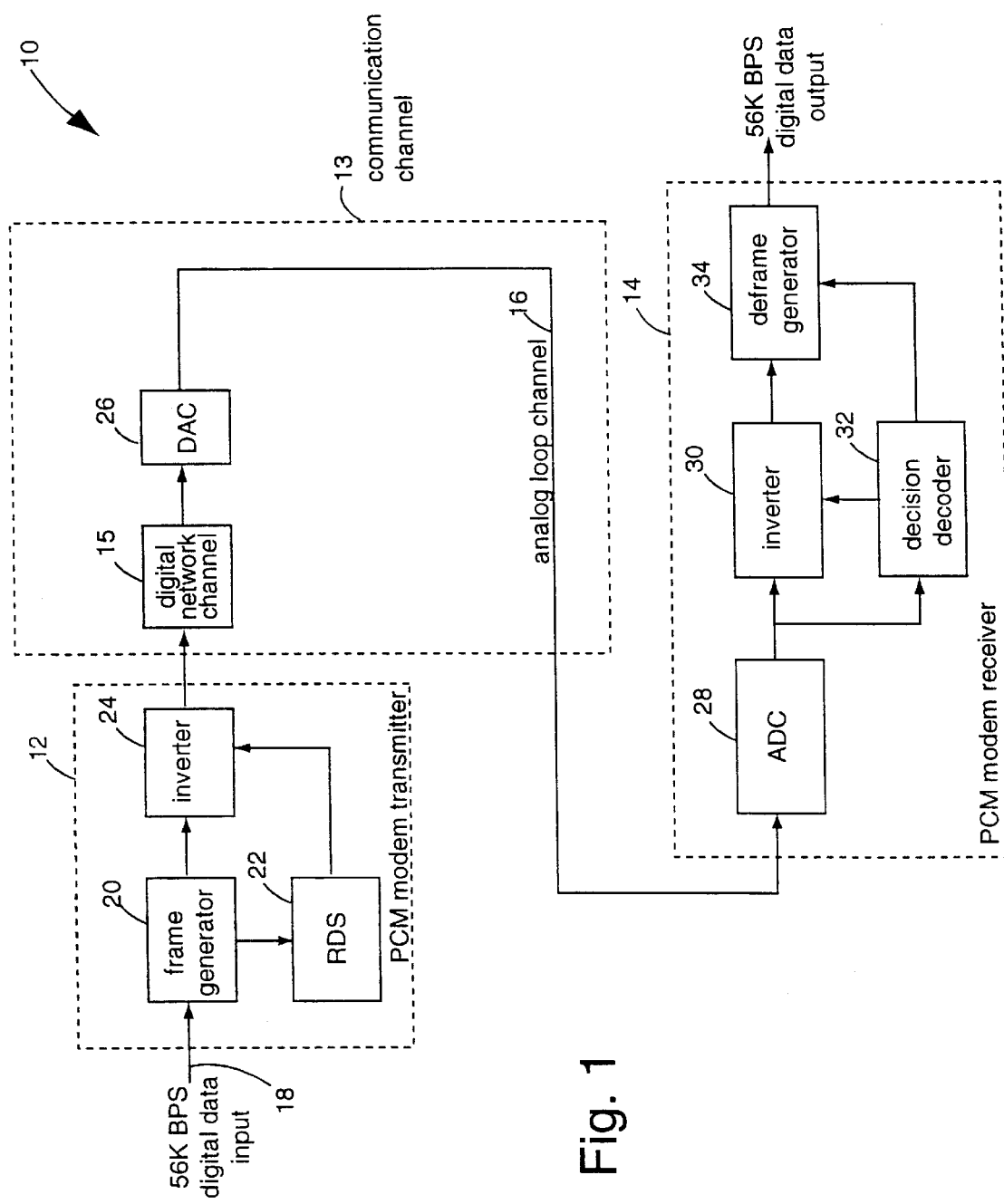
FIG. 1 is a block diagram of a PCM modem embodiment of the present invention in which a PCM modem transmitter is connected to a PCM modem receiver via a digital network channel and an analog communications channel.

In FIG. 1, a PCM modem embodiment of the present invention is referred to by the general reference numeral 10. A PCM modem transmitter 12 is connected to a PCM modem receiver 14 via a communications channel 13. A digital data input 18 is connected to the transmitter. A frame generator 20 organizes the data input into frames of PCM symbols. Several running-digital-sum based metrics of spectral shaping performance are computed by a running-digital-sum accumulator 22. Then the performance metrics are passed to an inverter 24 where decisions on which frame type and which inversion pattern to be used are made to optimize the spectral shaping performance. For example, for DC suppression, the goal is to keep the on-the-fly running-digital-sum value near zero. The inverter 24 also performs the determined inversion pattern on the whole frame to generate an output stream of PCM symbols. The output stream of PCM symbols is connected to a digital network channel 15. A digital-to-analog converter (DAC) 26, located at the end of the digital network, converts the frames one symbol at a time into an analog signal for output to the analog loop channel 16.

The public switched telephone network (PSTN) is typical of communication channels.

At the PCM modem receiver 14, the analog waveforms carried by the analog loop channel 16 is converted into a series of framed PCM samples by an analog-to-digital converter (ADC) 28. A decision decoder 32 decodes the frame inversion and frame type selection decision. An inverter 30 selectively inverts the received frame base on the instruction from the decision decoder 32. The output of the inverter 30 is passed to a deframe generator 34. The deframe generator 34 uses the instruction from the decision decoder 32 to recover the transmitted PC symbols and transmitted data bits.

Figure 2:
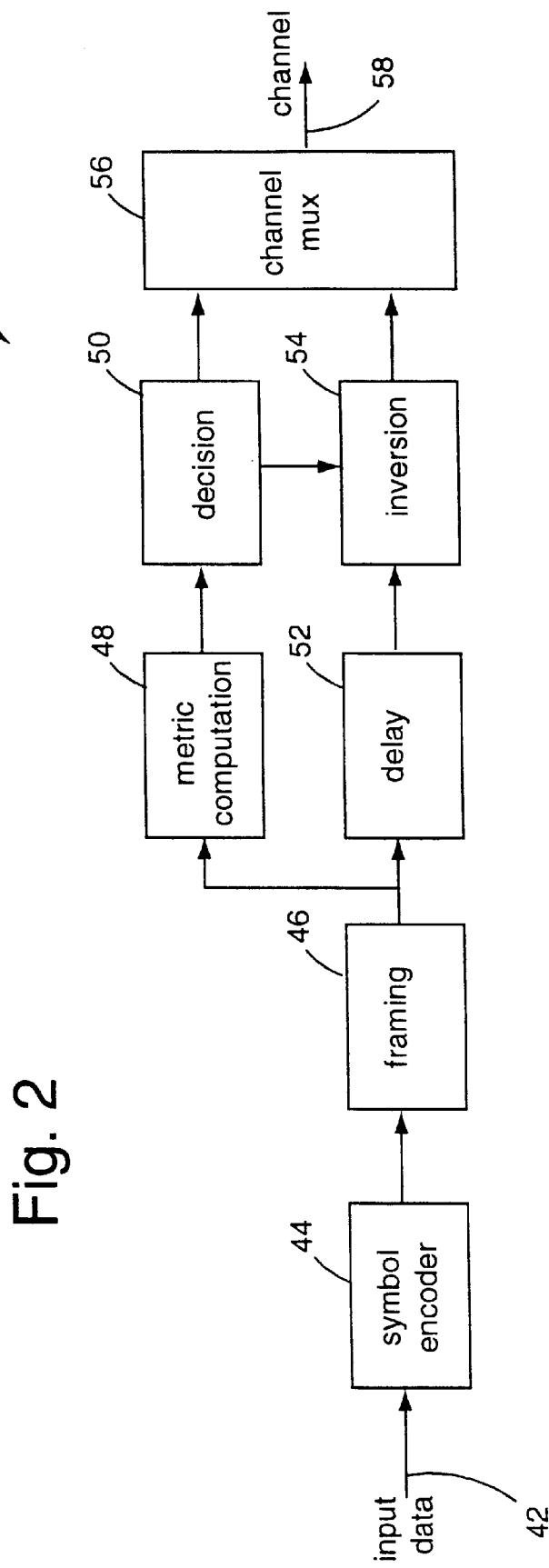
FIG. 2 is a functional block diagram of a PCM modem transmitter that includes a basic frame inversion encoder.

FIG. 2 represents a PCM encoder embodiment of the present invention, and is referred to herein by the general reference numeral 40. A transmitter datastream 42 is input to a symbol encoder 44, wherein the datastream is converted into a stream of PCM symbols. Such PCM-encoded symbol stream is forwarded to a framing mechanism 46 to form a plurality of different frame types. A metric computation mechanism 48 then computes the corresponding performance metrics for each frame type and its inversion. An inversion-decision mechanism 50 then decides which frame type is used for inversion that produces the best projected spectral shaping. A delay mechanism 52 can delay the frame selection and inversion by looking ahead in the datastream, e.g., in order to optimize performance. An inversion mechanism 54 implements the actual inversion of each frame selected in response to commands it receives from the inversion-decision mechanism 50. A channel multiplexer 56 combines the decision bits from decisions mechanism and output frame from the inversion mechanism 54 to form the encoded output frame. An encoded frame output 58 is then converted farther downstream outside the modem to an analog signal by a digital-to-analog converter (DAC).

Figure 3:
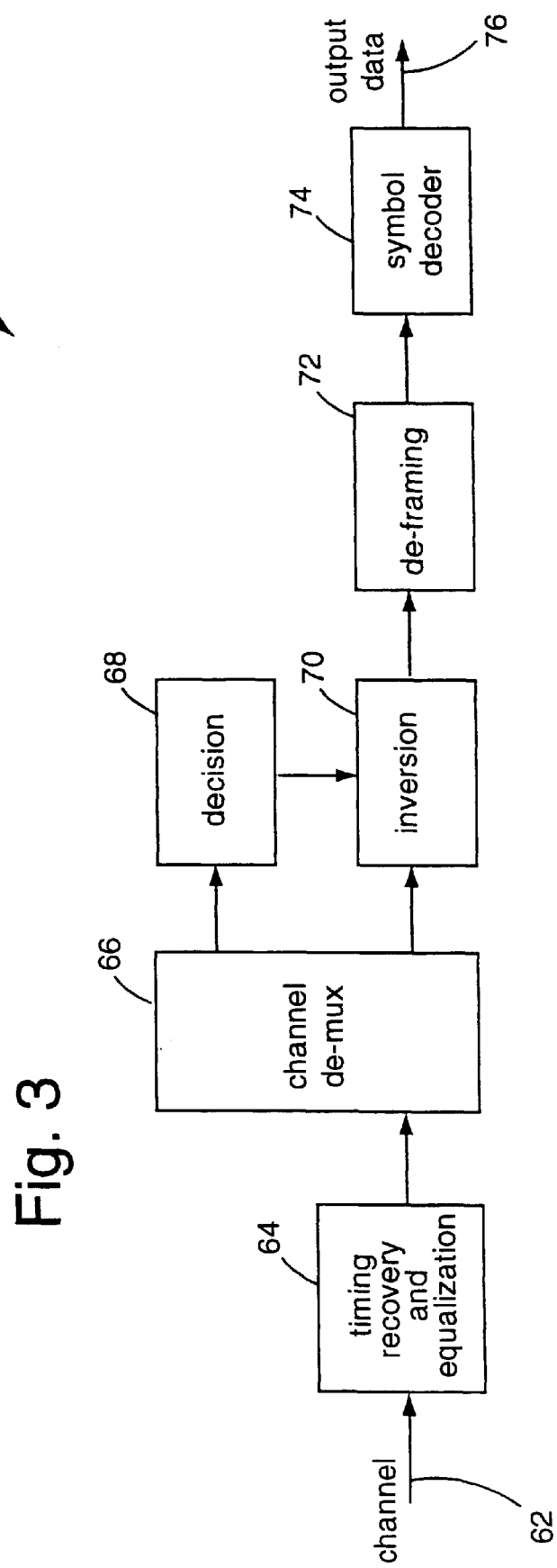
FIG. 3 is a functional block diagram of a PCM modem receiver that includes a basic frame inversion decoder.

FIG. 3 represents a PCM decoder embodiment of the present invention, and is referred to herein by the general reference numeral 60. An analog signal from the communication channel is converted to a digital signal 62 by an analog-to-digital converter (ADC). The digital signal 62 is input to a timing recovery and equalization mechanism 64 to correct sampling timing and to remove inter-symbol interference effects introduced by the channel. A channel demultiplexer 66 separates output frames from their frame selection and inversion-decision bits for an inversion-decision mechanism 68. Decision mechanism 68 makes inversion and frame selection decision. An inverter 70 will invert the reconstructed frames based on the instruction from decision mechanism 68. A de-framing mechanism 72 reconstitutes the PCM symbol streams based on the frame selection decisions. A symbol decoder 74 converts the PCM symbols back into a data bit stream 76.

Assuming a frame size of N, each frame has "b" user data bits, and, the number of framing patterns is $2^n$. Given "n" bits are needed to uniquely describe each of the different types of framing patterns and one bit to determine the inversion. Therefore, b+n+1 bits can be carried by each frame-b user data bits and n+1 spectral shaping bits. The number needed to represent or map these b+n+1 bits in a "p" level signal is $p^N \geq 2^{b+n+1}$. The mapping-level redundancy is $$\frac{p^N - 2^b}{p^N},$$

and the bit level redundancy is $$\frac{n+1}{b+n+1}.$$

In general, redundancy is reduced when larger mapping frames are used, and more bits are packed into a given frame.

Any n+1 of the b+n+1 bits can be used to represent the spectral shaping bits. In practice, it is preferable to use either all sign bits, or non-sign bits. The two most widely used PCM encoding methods, e.g., A-law and µ-law, are both sign-magnitude encoding methods. Bits represented by non-sign bits are not subject to change due to inversion of the frame. However, the magnitude of the sample can change due to different values of inversion and frame select bits. Such then needs to be taken into account when computing a metric.

The inversion and frame selection bits can be put in a later frame. The advantage of doing this is that the inversion and frame selection bits are already fixed when the metric is computed in the later frame. It is also possible to use sign bits to represent both the inversion and frame selection bits. The use of sign bits is more convenient in practice because the magnitude will not change during inversion. Sign bit errors can corrupt multiple symbols. So, some sort of differential encoding is normally needed to limit this error propagation mechanism.

A running-digital-sum of the symbols can be used as a measure of the amount of DC and low frequency distortion that is potentially present in a transmitted PCM sample sequence, e.g., "$RDS_0$". The smaller the running-digital-sum values for every sample in a sequence are, the better. Two sequences can be compared for their respective DC and low frequency components by comparing the sum-of-squares of their running-digital-sum values at each sample moment. The sequence having the smaller sum-of-squares values has the superior DC and low frequency fidelity.

Another important source of PCM modem distortion is the band edge attenuation that occurs at half the design sampling rate. For most PCM systems, such band edge will be centered at about 4,000 Hz. The running-digital-sum at 4,000 Hz ("$RDS_4$") can be defined for any given sample as the sum of all even-numbered samples minus the sum of all the odd-numbered samples, up to and including the current sample. The 4,000 Hz component of two sequences can also be compared by using the sum-of-square of the running-digital-sum at 4,000 Hz.

Embodiments of the symbol encoder 44 can use any one of a plurality of mapping methods. For example, modulo conversion finds the remainders of successive division by a divider "p". Such remainders are then encoded as PCM samples.

Given "On", the number of selectable frame types is $2^n$, and such will be adequate in number to overcome the most common types of PCM modem distortion, e.g., distortion at DC and 4,000 Hz. So, n=0 or n=1 is usually good enough. Two frame types can be used to convey the samples, one where no samples are inverted and the other to indicate that all the even samples are inverted. If this is combined with the use of an inversion bit, an exclusive-or situation is created and four combinations can be uniquely represented, e.g., no samples are inverted, all even samples are inverted, all odd samples are inverted, and all samples are inverted.

The frame size N and the number of redundant bits n+1 together determine the frame redundancy rate. After choosing n, the frame size N will determine the frame redundancy rate $$\frac{n+1}{N}.$$

Also the frame size N may be chosen for other reasons. For example, in robbed-bit signaling (RBS) µ-law PCM networks, the least significant bits of a PCM stream are periodically usurped for network signaling. Robbed-bit signaling typically has a period of six symbols or some whole multiple of six symbols. Such bit usurpation does not seem to have significant adverse effect on voice band signals, but could adversely affect PCM modem data transmission. PCM modem performance can be improved if robbed-bit signaling effects can be mitigated. To mitigate the robbed-bit signaling effect, PCM modems with inherent framing structures of six symbols can be used, e.g., N=6 12, 18, . . . , etc.

In general, the raw data rate is $$\frac{(b+n+1)}{N} 8 \text{ kilo bits per second (KBPS)}$$

and the effective bit rate is $$\frac{b}{N} 8 \text{ KBPS}.$$

For N=6, both of these bit rates are multiples of 1.333 KBPS. The detailed operation of the current invention can be seen from an example. Choosing n=1, N=6, and p=64, and using sign bits to represent the frame selection and inversion bits, the frame rate is $$\frac{8}{6} = 1.333 \text{ kilo-frames per second.}$$

The total number of bits in each frame equals forty-two, six bits per symbol with total six symbols in a frame and six sign bits. The raw data rate is 56K bits per second, forty-two bits per frame with frame rate 1.333 kilo-frames per second. With n+1=2 bits per frame for spectral shaping, the cost in data rate due to redundancy is $$\frac{n+1}{N} \times \text{Symbol Rate} = \frac{2}{6} \times 8 = 2.666 \text{ KBPS}.$$

Therefore, the effective data rate is 56−2.666=53.333 KBPS.

In preferred embodiments of the present invention, for every forty user data bits, $b_0, \ldots, b_{39}$, accepted each frame interval, there are seven operations, A—G, performed:

A. The symbol encoder 44 accepts forty user data bits, $b_0, \ldots, b_{39}$. The first thirty-six user data bits, $b_0, \ldots, b_{35}$ are used to encode six magnitudes, $r_0, \ldots, r_5$, as follows:
  (1) the thirty-six bits are represented as an integer defined by $R_0 = b_0 + 2^1 b_1 + 2^2 b_2 + \ldots + 2^{35} b_{35}$;
  (2) the first magnitude $r_0$ is the remainder of $R_0$ modulo p, e.g., $r_0 = R_0 \bmod p$; and
  (3) from $R_0$ and $r_0$ find the i'th magnitude $r_i$, by finding $R_i = (R_{i-1})p^{-1}$ and $r_i = R_i \bmod p$ where $i = 1, \ldots, 5$;
  (4) symbol encoder 44 uses such six magnitudes, $r_0, \ldots, r_5$, and the other four user data bits, $b_{36}, \ldots, b_{39}$, to create six signed symbols, $s_0, \ldots, s_5$, as follows:
    (a) symbols $s_0$ and $s_1$ have magnitude $r_0$ and $r_1$ respectively, and sign bits 0; and
    (b) symbols $s_2, \ldots, s_5$ have magnitudes $r_2, \ldots, r_5$ respectively, and sign bits $b_{36}, \ldots, b_{39}$ respectively.

When the sign bit is zero, the symbol accepts a positive value. When the sign is one, the symbol accepts a negative value. Here the two inversion and frame selections bits are at the position of the sign bits of $s_0$ and $s_1$.

B. The framing mechanism 46 then creates two types of frames using $s_0, \ldots, s_5$, as follows: $F_1 = (s_0, s_1, s_2,$ -continued $s_3, s_4, s_5)$ and $F_2 = (s_0, -s_1, s_2, -s_3, s_4, -s_5).$ Where $-s_1$ is created from $s_1$ by inverting its sign bit, the same applies to other symbols. $F_1$ has inversion pattern 000000, and $F_2$ has inversion pattern 010101. A zero in the inversion pattern does not mean the corresponding symbol will have sign bit of zero. Instead it means that the symbol keeps the originally assigned sign bit, while a one in inversion pattern means that the corresponding symbol changes the originally assigned sign bit. Mathematically, the two different frames are obtained by sequentially exclusive-or the sign bits of symbols $s_0, \ldots, s_5$ with the two sign inversion patterns 000000 and 010101. Given $F'_1=(-s_0, -s_1, -s_2, -s_3, -s_4, -s_5)$ and $F'_2=$of $(-s_0, s_1, -s_2, s_3, -s_4, s_5)$ to represent the inversions of $F_1$ and $F_2$. $F'_1$ and $F'_2$ have the corresponding inversion patterns 111111 and 101010.

C. The delay mechanism 52 stores a predetermined number of output frame pairs from the framing mechanism 46. The depth of the delay (the number of frame pairs it stores) affects the performance and search complexity of the inversion-decision mechanism 50. Generally, the larger the delay, the better the performance, and the higher the search complexity. Embodiments of the present invention in extensive simulation indicate that the largest performance improvement happens when delay depth is one or two. Incremental performance improvement due to additional delay becomes smaller and smaller, and diminishes with delay depth of more than four. So the delay depth between zero and four is a good range. To distinguish frames with different delays, given $F_1(k)$ to represent $F_1$ with delay k. $F_1(0)$ is current $F_1$. Similarly, given $F_2(k)$, $F'_1(k)$, and $F'_2(k)$ to represent $F_2$, $F'_1$ and $F'_2$ with delay k.

D. The operation of the metric computation mechanism 48 computes a set of metrics based on the objective of the encoder. The metric computation mechanism 48 computes this set of metrics using all possible combinations of frame sequences from frames stored in the delay mechanism 52 and their corresponding inversions and using running-digital-sum ($RDS_0$ or $RDS_4$ or both) computed from frames already outputted. To do these computations, the metric computation mechanism 48 needs to first convert the symbols into sample magnitudes that they represent according to a predefined conversion rule. The conversion rule can be A-law, $\mu$-law, or any other rules. Through out this description, any mathematical operations on symbols actually mean the operation on the sample they represent.

For a delay depth equal to zero, only the running-digital-sum computed up to the end of the previous frame, the current frame pair $F_1$ and $F_2$, as well as their inversions $F'_1$ and $F'_2$ are considered. The metrics mechanism 48 computes four numbers $S_0$, $S_1$, $S_2$ and $S_3$. The first, $S_0$ is computed using running-digital-sum and $F_1$. The second, $S_1$ is computed using running-digital-sum and $F_2$. The third, $S_2$ is computed using running-digital-sum and $F'_2$. And the fourth, $S_3$ is computed using running-digital-sum and $F'_1$.

When suppressing DC is an objective of the encoder, the four metrics $S_0$, $S_1$, $S_2$ and $S_3$ are sums-of-squares, as follows:

$S_0 = (RDS_0 + s_0)^2 + (RDS_0 + s_0 + s_1)^2$
$\quad + (RDS_0 + s_0 + s_1 + s_2)^2$
$\quad + (RDS_0 + s_0 + s_1 + s_2 + s_3)^2$ $$+(RDS_0+s_0+s_1+s_2+s_3+s_4+s_5)^2$$

$$S_1=(RDS_0+s_0)^2+(RDS_0+s_0-s)$$
$$+(RDS_0+s_0-s_1+s)$$
$$+(RDS_0+s_0-s_1+s_2-s)$$
$$+(RDS_0+s_0-s_1+s_2-s_3+s)$$
$$+(RDS_0+s_0-s_1+s_2-s_3+s_4-s_5)^2$$

$$S_2=(RDS_0-s_0)^2+(RDS_0-s_0+s)$$
$$+(RDS_0-s_0+s_1-s)$$
$$+(RDS_0-s_0+s_1-s_2+s)$$
$$+(RDS_0-s_0+s_1-s_2+s_3-s)$$
$$+(RDS_0-s_0+s_1-s_2+s_3-s_4+s_5)^2$$

and $$S_3=(RDS_0-s_0)^2+(RDS_0-s_0 s)$$
$$+(RDS_0-s_0-s_1-s)$$
$$+(RDS_0-s_0-s_1-s_2-s)$$
$$+(RDS_0-s_0-s_1-s_2-s_3-s)$$
$$+(RDS_0-s_0-s_1-s_2-s_3-s_4-s_5)^{2};$$

where $(RDS_0+s_0)^2$ is the square of the running-digital-sum of DC computed up to the sample $s_0$; $(RDS_0+s_0+s_1)^2$ is the square of the running-digital-sum of DC computed up to the sample $s_1$, etc. Hence, $S_0$ is the sum-of-squares of the running-digital-sum of DC for each and every symbol in the frame type $F_1$. Similarly, $S_1$ is the sum-of-squares of the running-digital-sum of DC for each and every symbol in the frame type $F_2$; $S_2$ is the sum-of-squares of the running-digital-sum of DC for each and every symbol in the frame type $F'_1$; and $S_3$ is the sum-of-squares of the running-digital-sum of DC for each and every symbol in the frame type $F'_2$.

In the case that suppressing 4,000 Hz is the objective of the encoder, the four metrics $S_0$, $S_1$, $S_2$ and $S_3$ are sums-of-squares as follows:

$$S_0=(RDS_4+s_0)^2+(RDS_4+s_0-s_1)$$
$$+(RDS_4+s_0-s_1+s_2)$$
$$+(RDS_4+s_0-s_1+s_2-s_3)$$
$$+(RDS_4+s_0-s_1+s_2-s_3+s_4)$$
$$+(RDS_4+s_0-s_1+s_2-s_3+s_4-s_5)^2$$

$$S_1=(RDS_4+s_0)^2+(RDS_4+s_0+s_1)$$
$$+(RDS_4+s_0+s_1+s_2)$$
$$+(RDS_4+s_0+s_1+s_2+s_3)$$
$$+(RDS_4+s_0+s_1+s_2+s_3+s_4)$$
$$+(RDS_4+s_0+s_1+s_2++s_4+s_5)^2$$

$$S_2=(RDS_4-s_0)^2+(RDS_4-s_0-s_1)$$
$$+(RDS_4-s_0-s_1-s_2)$$
$$+(RDS_4-s_0-s_1-s_2-s_3)$$
$$+(RDS_4-s_0-s_1-s_2-s_3-s_4)$$
$$+(RDS_4-s_0-s_1-s_2-s_3-s_4-s_5)^2$$

and $$S_3=(RDS_4-s_0)^2+(RDS_4-s_0+s_1-s_2)$$
$$+(RDS_4-s_0+s_1-s_2)$$
$$+(RDS_4-s_0+s_1-s_2+s_3)$$
$$+(RDS_4-s_0+s_1-s_2+s_3-s_4)$$
$$+(RDS_4-s_0+s_1-s_2+s_3-s_4+s_5)^2$$

The meaning of $S_0$, $S_1$, $S_2$ and $S_3$ are similar to the case of DC-suppression except we are using $RDS_4$ instead of $RDS_0$.

In the case that equally suppressing DC and 4,000 Hz is the objective of the encoder, the four metrics $S_0$, $S_1$, $S_2$ and $S_3$ are the sum of the corresponding metrics for DC and 4,000 Hz, e.g., $$S_i=S_{iDC}+S_{i4k}, i=0, \ldots 3,$$

where $S_{iDC}$ mechanism $S_i$ at DC and $S_{i4k}$ mechanism $S_i$ at 4,000 Hz.

In this case, $S_0$, $S_1$, $S_2$ and $S_3$ are the sum-of-squares of $RDS_0$ plus the sum-of-squares of $RDS_4$ up to every symbol interval using frame $F_1$, $F_2$, $F'_2$ and $F'_1$ respectively.

For delay depths greater than zero, a set of metrics using all possible combinations of frame sequences must be computed from frames stored in the delay mechanism 52 and their corresponding inversions. For instance, for a delay depth of one, sixteen metrics are computed using the following combinations of frame sequences:

$F_1(0)F_1(1)$
$F_1(0)F_2(1)$
$F_1(0)F'_2(1)$
$F_1(0)F'_1(1)$
$F_2(0)F_1(1)$
$F_2(0)F_2(1)$
$F_2(0)F'_2(1)$
$F_2(0)F'_1(1)$
$F'_2(0)F_1(1)$
$F'_2(0)F_2(1)$
$F'_2(\mathbf{0})F'_2(1)$
$F'_2(0)F'_1(1)$
$F'_1(0)F_1(1)$
$F'_1(0)F_2(1)$
$F'_1(0)F'_2(1)$
$F'_1(0)F'_1(1)$ Similarly, for delay depths of two, sixty-four metrics comprising of all possible frame combinations of delay 0, delay 1, and delay 2, are computed. Each time the delay depth is increased by one, the number of metrics to be computed increases by a factor of four.

---

E. The inversion-decision mechanism 50 chooses the smallest among the metrics computed by the metric computation mechanism 48 and selects the oldest frame, either $F_1$ or $F_2$, corresponding to the smallest metric. If the corresponding frame is an inverted frame, the inversion-decision mechanism 50 also enables the inverter 54 to invert the selected frame. The decision also updates the running-digital-sum, either $RDS_0$ or $RDS_4$, or both, according to the selected frame and inversion decision.

-continued

F. The inverter 54 accepts the frame selected by the inversion-decision mechanism 50, inverts it if enabled by the inversion-decision mechanism 50, and then outputs it to the channel multiplexer 56.
G. The channel multiplexer 56 combines the decision bits from the inversion-decision mechanism 50 and the output frame from the inverter 54 to form encoded output frames. The frame selection bit and inversion bit can be embedded in the frame by the framing and inversion process. The frame type and inversion can be uniquely determined from the sign bits of the first two symbols in an encoded output frame. If both symbols have the same sign bits, then $F_1$ is selected by the inversion-decision mechanism 50. Otherwise $F_2$ is selected by the inversion-decision mechanism 50. If the first symbol has a sign bit zero, the symbol is positive, the frame inversion is disabled. Otherwise the frame inversion is enabled.
The symbols from the encoded frames are then concatenated into a symbol stream and fed to the digital network channel 13 $s_0$ first in time.
This symbol stream is converted into a sample stream at the end of a digital channel through a DAC, then eventually into analog waveform, which is subject to further distortion by the analog channel and addition of additive noise.

Note that when a given frame from the symbol encoder finally reaches the digital channel, the frame is modified in one of four ways: 1. nothing (the frame reaches the digital channel unmodified); 2. all N sign bits in the frame are inverted; 3. odd-numbered sign bits are inverted; 4. even-numbered sign bits are inverted.

The basic frame inversion decoder accepts the signal at the end of the analog channel, and implements a number of steps to recover the transmitted user data bits, as follows:

A. The timing recovery and equalization mechanism 64 recovers the symbol timing and frame timing to remove any linear distortion caused by the analog channel, and eventually to recover the transmitted symbols.
B. The channel demultiplexer 66 retrieves the frame selection and inversion decision. In the previous example, this can be achieved by utilizing the sign bits of the first two symbols in each frame as described before.
C. The inversion-decision mechanism 68 uses the information from the channel demultiplexer 66 to decide which of two frames is being selected in the encoder, and whether or not it is inverted. It provides this information to the inverter 70 and de-framing mechanism 72.
D. The inverter 70 selectively inverts the received frame if the decision mechanism decides that the frame is inverted in the encoder.
E. The de-framing mechanism 72 accepts the received and selectively inverted frames and reconstructs the original symbol according to the information that the received frame is $F_1$ or $F_2$. From this information, the de-framing mechanism 72 derives the received symbols $s_0$, ..., $s_5$.
F. A symbol decoder 74 mechanism strips the sign bits from the received symbols $s_0$, ..., $s_5$ to derive the received magnitudes $r_0$, ..., $r_5$. The sign bits from symbols $s_2$, ..., $s_5$ are user data bits and saved for later output. An integer number is constructed from $r_0$, ..., $r_5$ as,
$R = r_0 + p^1 \cdot r_1 + p^2 \cdot r_2 + \ldots + p^5 \cdot r_5$ The first thirty-six user data bits $b_0, \ldots, b_{35}$ are derived from the binary representation of $$R = b_0 + 2^1 \cdot b_1 + 2^2 \cdot b_2 + \ldots + 2^{35} \cdot b_{35}$$

using a radix conversion procedure similar to that in the encoder.

The next four user data bits $b_{36}, \ldots, b_{39}$ are derived from the saved sign bits.

Scramblers are used in many commercial modems to ensure that the data bits input to the encoder are random. A scrambler, e.g., as described in ITU-T Recommendation V.34, "A modem operating at data signaling rates of up to 33600 bit/s for use on the general switched telephone network and on leased point-to-point 2-wire telephone-type circuits," can be inserted in the data bit stream entering the encoder 40.

Differential encoding is used in the prior art to make a transmission system invariant to sign change, e.g., to enable the receiver to correctly decode the bits even if all received symbols have had their signs changed for some reason. For example, in the $\mu$-law codec, a positive symbol will actually generate a negative voltage. If the receiver generates negative symbols based on negative voltage at the input of the analog-to-digital converter, all the sign bits of the input symbols to channel demultiplexers are inverted. Some example embodiments of the present invention are inherently invariant to sign changes in the channel. Therefore, a differential encoder is not strictly necessary, but differential encoding of the sign bits in the encoder can exist without doing the decoder any harm. In general, differential encoding may be necessary.

A variety of user bit rates can be achieved by changing the number of user data bits per frame "b", and the modulo base "p". The smallest possible p should be used because this will help to reduce the peak-to-average ratio therefore reduce the nonlinear distortion in the analog channel as well as make the symbol more random. The only constraint is $p^N \geq 2^{b+n+1}$. A different modulo base p can be used for each symbol in a frame.

The frame size N and the number of selectable frame $2^n$ all affect the amount of redundancy. Typically, the higher the redundancy the better the performance at a given raw data rate, but higher redundancy also costs more in user data rate. For N=6 that good performance is achieved for one or two bits redundancy. To use only one bit per frame redundancy, it can be set n=0, therefore we only have $F_1$ not $F_2$ in the framing mechanism 46. Alternatively, it can be still set n=1, but use N=12. In this case, redundancy is the same as in cases where n=0 and N=6, but the performance is better.

The sum-of-squares $RDS_0$ and $RDS_4$ measure for the frame selection and inversion determination metrics give good indications of the signal component power at DC and 4,000 Hz. Different measures for metrics can be used to reduce the amount of computation. The sum-of-squares of running-digital-sum can be computed at the frame boundary and not at every symbol interval. Absolute-sums instead of sum-of-squares can be used to emphasize more of the peaks in the running-digital-sum. Or, it can use absolute-maximum to minimize the peaks in running-digital-sum. Minimizing peaks in $RDS_0$ helps to reduce a problem known as DC wander, wherein the baseline of the received signal wanders because the channel blocked DC component in the signal. Such can be very important when the receiver does not provide sufficient equalization.

In alternative embodiments of the present invention, non-negative shell mapping can be used in the symbol encoder 44. Conventional shell mapping, e.g., as used in V.34, allows a trade off between constellation expansion and shaping gain. Shaping gain is possible because shell mapping provides a way to arrange all the possible vectors in a frame in a sequential order according to the total weight of the vectors. The vector with the smallest total weight is listed first, while the vector with the largest weight is listed last. The weight is related to signal power. The total number of vectors is more than is required to send bits. The small-weighted vector is sent first. Then some vectors with large total weights, thus large total power, will not be used, and the average signal power is reduced.

If the weight is not related to signal power, but to signal magnitude instead, then shell mapping provides a way to order vectors according to their total magnitude sum. Therefore, it may be possible to select vectors with only prescribed total magnitude sum, or vectors with their total magnitude sum within a prescribed range.

Suppose the signal symbol space is, $$S_n \epsilon \{-M, -M+1, \ldots, 0, \ldots, M-1, M\}.$$

A translation is done as $T_n = S_n + M$.

Then, $T_n \epsilon \{0, 1, \ldots, 2M\}$. Define the weight distribution function of $T_n$ as, $$G_1(x) = \sum_{k=0}^{2M} x^k.$$

That is the coefficient of $x_k$ is one if and only if $0 \leq k \leq 2M$, otherwise it is zero.

Then the weight distribution function of $T_n + T_{n-1}$, sum of two translated samples, is $$G_2(x) = G_1(x)G_1(x) = \left(\sum_{k=0}^{2M} x^k\right)^2.$$

The weight distribution function of the sum of N translated samples $$W = \sum_{n=0}^{N-1} T_n$$

is $$G_M(x) = \left(\sum_{k=0}^{2M} x^k\right)^N = \sum_{k=0}^{2MN} g_k x^k.$$

The number of DC-free vectors, sum of symbol magnitude equal to zero, is given by $g_{MN}$. The number of non-negative vectors, sum of symbol magnitude not less than zero, is given by, $$P_{MN} = \sum_{k=MN}^{2MN} g_k.$$

The information rate loss at mapping level is due to the fact that we only choose the DC-free vector or non-negative vector are $L_0 = N \log_2(2M+1) - \log_2 g_{MN}$, and $L_P = N \log_2(2M+1) - \log_2 P_{MN}$, respectively, and $L_P < 1$.

The C-language source code provided in the appendix gives the details of a modified or non-negative shell mapping algorithm of the present invention for frame size N=8. The names and symbols are chosen to be the same as in ITU V. 34 for easy understanding. Such C-language source code shows a routine for computing non-negative shell mapping. If only z8 [0] and z8 [1] are used, then the result is DC free.

A first M is selected to be large enough to accommodate the shell mapping bits. The first transmit frame is encoded using the proposed shell mapping algorithm to get N samples. The digital running sum S is set to the sum of all N samples. Each additional transmit frame is encoded using the proposed shell mapping algorithm to get N new samples. If the sum of the N new samples is not zero, then it must be positive, and the current digital running sum is positive, then all samples are inverted in the current frame. Otherwise, the samples in the current frame are sent unchanged.

In the decoder, a check is made to see if the sum of the currently received frame is negative. If it is, then all the samples in the current frame are inverted. Otherwise, the current frame is unchanged. The resulting frame is sent to a shell mapping decoder.

In DC-free cases and N=eight, the number of shell mapping bits K versus 2M+1 are computed, and the redundancy per symbol defined by $\log_2(2M+1) - K/8$. The results were:

| k | 2M + 1 | redundancy |
| --- | --- | --- |
| 10 | 3 | 0.334 |
| 11 | 5 | 0.946 |
| 12 | 5 | 0.821 |
| 13 | 5 | 0.696 |
| 14 | 5 | 0.571 |
| 15 | 5 | 0.446 |
| 16 | 7 | 0.807 |
| 17 | 7 | 0.682 |
| 18 | 7 | 0.557 |
| 19 | 9 | 0.794 |
| 20 | 9 | 0.669 |

In a $\mu$-law codec, choosing the minimum distance to be approximately sixty-four, then seven groups are obtained, e.g., choosing all points from segment ±8, ±7, ±6 and choose thirty-two points from the reset of ten segments. Each group has sixteen points. The distances within the seven groups are 256, 128, 64, 64, 64, 128, and 256 respectively. If given non-negative shell mapping in this case, the information rate is given by $$R = 8\log_2 7 + 31 \text{ kbpss} = 53.45 \text{ KBPS}.$$

For the non-negative shell mapping to work, given a need weight distribution function of, $$g_1(x) = 1 + x^4 + x^6 + x^7 + x^8 + x^{10} + x^{14}.$$

This distribution function is used in the C-language source code. The redundancy is less than one bit per frame.

Alternatively, only those vectors with small absolute magnitude sum can be used as a constraint. The redundancy versus rate loss will be somewhere between the DC-free case and the non-negative shell mapping case.

Such shell mapping algorithm still allows some other objective such as shaping gain, etc., to be achieved, because not all possible vectors are used for encoding.

In the following, we describe how to use this new algorithm to suppress DC using $RDS_0$. To suppress 4000 Hz, we only need to perform DC suppression then invert all even samples (or all odd samples) before output to the channel. In this case, $RDS_0$ becomes $RDS_4$. The result is the same as modulating the DC suppressed output to 4000 Hz. In the receiver, all even samples (or odd samples) from the equalizer are inverted before going into the decision and inversion means. To suppress both DC and 4000 Hz, we only need to have two identical encoders suppressing DC then interleave the output, while all even-numbered symbols are from one encoder and all odd-numbered symbols are from the other encoder. In this way, the RDS at DC is the sum of the RDSs at DC from the two encoders, and Rds at 4000 Hz is the difference of RDSs at DC from the two encoders.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

Appendix

```
DC-suppression shell mapping algorithm.
Provided as PCM modem standard contribution.
Copyright (c) 1997, by ESS Technology, Inc.
#include <stdlib.h>
#include <math.h>
#include <stdio.h>
#define MAPFSIZE 8
#ifndef MSDOS
#define max(x,y) ((x)>(y)?x:y)
#endif
#define MAXM    15
int M,M1;
unsigned int g1[MAXM] = (1,0,0,0,1,0,1,1,1,0,1,0,0,0,1);
unsigned int g2[2*(MAXM-1)+1],g4[4*(MAXM-1)+1];
unsigned long z8[4*MAXM+2];
/* prototypes */
long int sm_decode(int m[8]);
void form_g2_g4_z8();
void init()
    {
    /* number of points in constellation */
    M = MAXM; /* M is the size of alphabet */
    M1 = M-1;  /* M1 is the maximum alphabet */
    /* init for shell mapping */
    form_g2_g4_z8();
    }
/* generate table g2, g4 and z8 for encoder and decoder */
void form_g2_g4_z8 (long md)
{
    int i,j;
    for(i = 0; i<M1; i++) {
        g2[i] = 0;
        for(j = 0;j< = i;j++)
            g2[i]+ = g1[j]*g1[i-j];
        g2[2*M1-i] = g2[i];
    }
    for(i = 0;i< = 2*M1;i++) {
        g4[i] = 0;
        for(j = 0;j< = i;j++)
            g4[i]+ =g2[j]*g2[i-j];
        g4[4*M1-i] = g4[i];
    }
    for(i = 0;i< = 4*M1;i++) {
        z8[1+4*M1-i] = 0;
        for(j = 0;j< = i;j++)
            z8[1+4*M1-i]+ = (long) g4 [j] * g4 [i-j];
    }
    z8 [0] = 0;
    for (i = 0;i< = 4*M1;i++)
        z8[i+1]+ = z8 [i];
}
/* decoder with input m[8] and returns data */
long int sm_decode(int m[8])
{
    int i, j, r21, r22, r23, r24, i21, i22, i23, i24, r41, r42, i41, i42;
    long r8;
    i21 = m[0] + m[1];
    r21 = 0;
    for(j = max (0, i21-M1) ;j<m[0] ;j++)
        r21+ = g1 [j]*g1 [j]*g1[i21-j];
```

Appendix -continued

```
    i22 = m[2] +m[3];
    r22 = 0;
    for (j = max (0, i22-M1) ;j<m[2] ;j++)
        r22+ = g1 [j] * g1 [i22-j];
    i41 = i21+i22;
    r41 = r22^g2[i21] + r21;
    for(j = max (0,i41-2*M1);j<i21;j++)
        r41+ = g2[j]*g2{i41-j];
    i23 = m[4] +m[5];
    r23 = 0;
    for(j = max(0, i23-M1); j<m[4];j++)
        r23+ = g1[j]*g1[i23-j];
    i24 = m[6]+m[7];
    r24 = 0;
    for(j = max(0, i24-M1); j<m[6];j++)
        r24+ = g1[j]*g1[i24-j];
    i42 = i23+i24;
    r42 = r24*g2[i23]+r23;
    for(j = max(0, i42-2*M1);j<i23;j++)
        r42+ = g2[j]*g2[i42-j];
    i = i41+i42;
    r8 = (long)r42*g4[i41]+r41;
    for(j = max(0, i-4*M1);j<i41;j++)
        r8+ = (long)g4[j]*g4[i-j];
    return r8+z8[i-4*M1];
}
/* decompose data into r41 and r42, as well as total cost ii and ss */
void sm12 (long data, int *r41, int *ii, int *ss)
{
    int i, s, t;
    long r8, g42;
    i = 0; s = 4*M1;
    while(s!=i) {
        t = i+(s-i+1) /2;
        if(z8[t]>data) s = t-1;
        else i = t;
    }
    r8 = data-z8[i];
    i+ = 4*m1;
    s = max (i-4*M1-1, -1);/* FIR filtering to find residue */
    while (r8>=0) {
        s++;
        r8- = g42 = (long)g4[s]*g4[i-s];
    }
    r8+ = g42;
    *r42 = (int) (r8/g4[s]);/*determine r41 and r42 */
    *r41 = (int) (r8-(*r42)*g4[s]);
    8ii = i; *ss = s;
}
/* decompose into m[2] using cost i and residue r2 */
{
    int t,s;
    s = max(i-M1-1, -1);
    while (r2> = 0) {
        s++;
        r2- = g1[s]*g1[i-s];
    }
    m[0] = s;   /* determine m1, and m2 */
    m[1] = i-s;
}
/* decompose into m[4] using cost i and residue r4 */
{
    int t, s, r21, r22;
    s = max(i-2*M1-1, -1);
    while (r4> = 0) {
        s++;
        r4- = t = g2[s]*g2[i-s];
    }
    r4+ = t;
    r22 = r4-r22*g2[s];
    /* determine m1, m2, m3, and m4 */
    sm56 (s, r21, m);
    sm56 (i-s, r22, &m[s]);
}
/* encode with data, and output is m[8] */
void sm_encode (long data, unsigned int m[8])
```

-continued

Appendix

```
{
  int i, s, r41, r42;
  sm12(data, &r41, &r42, &i, &s);
  sm34(s, r41, m);
  sm34(i-s, r42, &m[4]);
}
main()
{
  int m[MAPFSIZE], n, s;
  long int i, nout, output, input;
  init();
  nout = 332757;
  for(i = 0; i<nout; i++) {
    input = i;
    sm_encode(input, m);
    s = 0;
    for(n = 0; n<8; n++)
      s += m[n];
    output = sm_decode(m);
    if ((s<4*M1) || (input! = output)) {
      printf("%d %d| %1d %1d/n", s, 4*M1, input, output);
    }
  }
}
Example #2
#include <stdlib.h>
#include <math.h>
#include <stdio.h>
#define MAPFSIZE 8 /* frame size is eight symbols */
#ifndef MSDOS
#define max(x,y) ((x)>(y)?x:y)
#endif
#define MAXM
int M,M1;
unsigned int g1[MAXM] = {1,O,O,O,1,O,1,1,O,1,O,O,O,1};
unsigned int g2[2*(MAXM-1)+1],g4[4*(MAXM-1)+1];
unsigned long z8[4*MAXM+2];
/* prototypes */
long int sm_decode(int m[8]);
void form_g2_g4_z8();
void init()
{
  /* number of points in constellation */
  M = MAXM;    /* M is the size of alphabet */
  M1 = M-1;    /* M1 is the maximum alphabet */
  /* int for shell mapping */
  form_g2_g4_z8();
}
/* generate table g2, g4 and z8 for encoder and decoder */
void form_g2_g4_z8(long md)
{
  int i,j;
  for(i = O;i< = M1;i++) {
    g2[i] = 0;
    for(j = 0;j< = i;j++)
      g2[i]+ = g1[j]*g1[i-j];
    g2[2*M1-i] = g2[i];
  }
  for(i = 0;i< = 2*M1;i++) {
    g4[i] = 0;
    for(j = 0;j< = i;j++)
      g4[i]+ = g2[j]*g2[i-j];
    g4[4*M1-i] = g4[i];
  }
  for(i = 0;i< = 4*M1;i++) {
    z8[1+4*M1-i] = 0;
    for(j = 0;j< = i;j++)
      z8[1+4*M1-i]+ = (long)g4[j]*g4[i-j];
  }
  z8[0] = 0;
  for(i = 0;i< = 4*M1;i++)
    z8[i+1]+ = z8[i];
}
/* decoder with input m[8] and returns data */
long int sm_decode(int m[8])
{
  int i,j,r21,r22,r23,r24,i21,i22,i23,i24,r41,r42,i41,i42;
  long r8;
  i21 = m[0]+m[1];
  r21 = 0;
  for(j = max(0,i21-M1);j<m[0];j++)
    r21+ = g1[j]*g1[i21-j];
  i22 = m[2]+m[3];
  r22 = 0;
  for(j = max(O,i22-M1);j<m[2];j++)
    r22+ = g1[j]*g1[i22-j];
  i41 = i21+i22;
  r41 = r22*g2[i21]+r21;
  for(j = max(O,i41-2*M1);j<i21;j++)
    r41+ = g2[j]*g2[i41-j];
  i23 = m[4]+m[5];
  r23 = 0;
  for(j = max(0,i23-M1);j<m[4];j++)
    r23+ = g1[j]*g1[i23-j];
  i24 = m[6]+m[7];
  r24 = 0;
  for(j = max(O,i24-M1);j<m[6];j++)
    r24+ = g1[j]*g1[i24-j];
  i42 = i23+i24;
  r42 = r24*g2[i23]+r23;
  for(j = max(O,i42-2*M1);j<i23;j++)
    r42+ = g2[j]*g2[i42-j];
  i = i41+i42;
  r8 = (long)r42*g4[i41]+r41;
  for(j = max(0,i-4*M1);j<i41;j++)
    r8+ = (long)g4[j]*g4[i-j];
  return r8+z8[i-4*M1];
}
/* decompose data into r41 and r42, as well as total cost ii and ss */
void sm12(long data,int *r41, int *r42,int *ii, int *ss)
{
  int i,s,t;
  long r8,g42;
  i = 0; s = 4*M1;
  while(s! = i) {
    t = i+(s-i+1)/2;
    if (z8[t]>data) s = t-1;
    else i = t;
  }
  r8 = data-z8[i];
  i+ = 4*M1;
  s = max(i-4*M1-1, -1);/* FIR filtering to find residue */
  while (r8> = 0) {
    s++;
    r8- = g42 = (long)g4[s]*g4[i-s];
  }
  r8+ = g42;
  *r42 = (int) (r8/g4[s]);/* determine r41 and r42 */
  *r41 = (int) (r8~(*r42)*g4[s]);
  *ii = i; *ss = s;
}
/* decompose into m[2] using cost i and residue r2 */
void sm56(int i, int r2, unsigned int m[2])
{
  int t,s;
  s = max(i-M1-1,-1);
  while (r2>= 0) {
    s++;
    r2- = g1[s]*g1[i-s];
  }
  m[O] = s;   /* determine m1, and m2 */
  m[1] = i-s;
}
/* decompose into m[4] using cost i and residue r4 */
void sm34(int i, int r4, unsigned int m[4])
{
  int t,s,r21,r22;
  s = max(i-2*M1-1,-1);
  while(r4> = O) {
    s++;
    r4- = t = g2[s]*g2[i-s];
  }
  r4+ = t;
  r22 = r4/g2[s];
```

```
                         Appendix r21 = r4-r22*g2[s];
    /* determine m1, m2, m3, and m4 */
    sm56(s,r21,m);
    sm56(i-s,r22,&m[2]);
  }
  /* encode with data, and output is m[8] */
  void sm_encode(long data, unsigned int m[8])
  {
    int i,s,r41,r42;
    sm12(data,&r41,&r42,&i,&s);
    sm34(s,r41,m);
    sm34(i-s,r42,&m[4]);
  }
  main()
  {
    int m[MAPFSIZE],n,s;
    long int i,nout,output,input;
    init();
    nout = 332757;
    for(i = 0;i<nout;i++) {
        input = i;
        sm_encode(input,m);
        S = 0;
        for(n = 0;n<8;n++)
            s + = m[n];
        output = sm_decode(m);
        if ((s<4*M1)||(input! = output)) {
           printf("%d %d|%1d %1d\n",s,4*M1,input,output);
        }
     }
  }
```

What is claimed is:

1. A frame-inversion encoder for a pulse coded modulation (PCM) modem, comprising:
a symbol encoder for converting an incoming datastream into a PCM symbol stream;
a framing mechanism for grouping said PCM symbol stream into a finite plurality of standardized frame types;
an inversion-decision mechanism connected to said framing mechanism and for selecting on-the-fly particular frames for inversion of substantially all symbols of the selected frames according to an objective function wherein an encoded PCM symbol stream is produced; and
an output for outputting of said encoded PCM symbol stream to an analog-type communications channel, wherein the PCM symbol stream is converted to an analog signal.

2. A frame-inversion decoder for receiving an input after conversion from an analog signal on a pulse coded modulation (PCM) communications channel, comprising:
a timing recovery and equalization mechanism for correcting sample timing and for removing inter-symbol interference effects introduced by a PCM communications channel;
an inverter for inverting substantially all of the symbols of a series of reconstructed frames based on the state of a series of corresponding inversion bits;
a frame decoder for reconstituting a PCM symbol stream based on a plurality of frame selection decisions; and
a symbol decoder for converting individual PCM symbols back into a data bit stream.

3. A pulse coded modulation PCM modem communication system, comprising:
a frame -inversion encoder including a symbol encoder for converting incoming data into a stream of PCM symbols, a framing mechanism for grouping said stream of PCM symbols into a finite plurality of standardized frame types, an inversion-decision mechanism connected to said framing mechanism and for selecting on-the-fly particular frames for inversion of substantially all symbols of the selected frames according to an objective function, and an output for outputting to a digital communications channel, wherein the output PCM symbol stream is converted to an analog stream; and
a frame-inversion decoder for receiving an input after conversion from an analog signal on a communications channel, and including a timing recovery and equalization mechanism to correct sampling timing and to remove inter-symbol interference effects introduced by said communications channel, an inverter for inverting substantially all of the symbols of each of a series of reconstructed frames based on the state of a series of corresponding inversion bits, a frame decoder for reconstituting a PCM symbol stream based on a plurality of frame selection decisions, and a symbol encoder for converting individual PCM symbols back into a data bit stream.

4. A frame inversion encoder for a pulse coded modulation (PCM) modem, comprising:
a symbol encoder configured to convert an incoming datastream into a PCM symbol stream;
a frame encoder configured to group said PCM symbol stream into a finite plurality of standardized frame types; and
a frame inverter configured to invert substantially all symbols within a particular frame according to a predetermined function to produce an encoded PCM symbol stream.

5. A spectral shaping method for a PCM communications system, comprising:
encoding data input into a first frame made up of a plurality of symbols;
computing a set of a plurality of metrics, each metric being based on a measure of frames that preceded the first frame as well as framing and inversion selections of the first frame;
modifying a sign bit of each of the symbols of the first frame according to particular values of the set of metrics;
outputting the first frame to a digital channel; and
updating at least one of the encoder-performance metrics.

6. A method according to claim 5, further comprising
encoding a user data input into a frame of "N" number of symbols;
passing a frame through without modification according to particular values of a metric.

7. A method according to claim 5, further comprising
encoding a user data input into a frame of "N" number of symbols;
modifying a sign bit of each of the symbols of the first frame according to particular values of a metric by inverting "N" number of sign bits corresponding to "N" number of the symbols in the first frame.

8. A method according to claim 5, further comprising
encoding a user data input into a frame of "N" number of symbols;
modifying a sign bit of each of the symbols of the first frame according to particular values of a metric by inverting sign bits of only even-numbered ones of "N" number of the symbols in the first frame.

9. A method according to claim 5, further comprising encoding a user data input into a frame of "N" number of symbols;
modifying a sign bit of each of the symbols of the first frame according to particular values of a metric by inverting sign bits of only odd-numbered ones of "N" number of the symbols in the first frame.

10. A method according to claim 5, further comprising encoding a user data input into a frame of "N" number of symbols; and
modifying a sign bit of each of the symbols of the first frame according to particular values of a set of four metrics $S_1$, $S_2$, $S_3$, and $S_4$ by performing one of the following:
passing a frame through without modification;
inverting "N" number of sign bits corresponding to "N" number of the symbols in the first frame;
inverting sign bits of only odd-numbered ones of "N" number of the symbols in the first frame; and
inverting sign bits of only even-numbered ones of "N" number of the symbols in the first frame.

11. A method according to claim 5, further comprising encoding a user data input into a frame comprised of a number of symbols;
modifying a sign bit of each of the symbols of the first frame according to particular values of a metric by passing a frame through without modification.

12. A method according to claim 5, further comprising encoding a user data input into a frame of a number of symbols;
modifying a sign bit of each of the symbols of the first frame according to particular values of a metric by inverting the number of sign bits corresponding to number of the symbols in the first frame.

13. A method according to claim 5, further comprising encoding a user data input into a frame of a number of symbols;
modifying a sign bit of each of the symbols of the fiat frame according to particular values of a metric by inverting sign bits of only even-numbered occurrences of the number of the symbols in the first frame.

14. A method according to claim 5, further comprising encoding a user data input into a frame of a number of symbols;
modifying a sign bit of each of the symbols of the first frame according to particular values of a metric by inverting sign bits of only odd-numbered occurrences of the number of the symbols in the first frame.

15. A method according to claim 5, further comprising encoding a user data input into a frame of a number of symbols; and
modifying a sign bit of each of the symbols of the first frame according to particular values of a set of four metrics $S_1$, $S_2$, $S_3$, and $S_4$ by performing one of the following:
passing a frame through without modification;
inverting the number of sign bits corresponding to the number of the symbols in the first frame;
inverting sign bits of only odd-numbered occurrences of the number of the symbols in the first frame; and
inverting sign bits of only even-numbered occurrences of the number of the symbols in the first frame.

16. A frame-inversion encoder for a pulse coded modulation (PCM) modem, comprising:

a symbol encoder having a first converter configured to convert an incoming datastream into a PCM symbol stream;
a framing mechanism configured to group the PCM symbol stream into a plurality of predetermined frame types;
an inversion-decision mechanism connected to the framing mechanism configured to dynamically select particular frames;
an inverter configured to invert substantially all symbols of the selected frames according to an objective function, to produce an encoded PCM symbol stream;
a second converter configured to convert the PCM symbol stream to an analog signal; and
an output configured to output the encoded PCM symbol stream to an analog-type communications channel.

17. A frame-inversion encoder for use in a pulse coded modulation (PCM) modem, comprising:
a symbol encoder having a converter configured to convert an incoming datastream into a PCM symbol stream;
a framing mechanism configured to group the PCM symbol stream into a predetermined frame type;
an inversion-decision mechanism connected to the framing mechanism configured to dynamically select a particular frame; and
an inverter configured to invert substantially all symbols of the selected frame according to an objective function, to produce an encoded PCM symbol stream.

18. A frame-inversion encoder according to claim 17, further comprising:
a second converter configured to convert the PCM symbol stream to an analog signal; and
an output configured to output the encoded PCM symbol stream to an analog-type communications channel.

19. A frame-inversion decoder for receiving an input after conversion from an analog signal on a pulse coded modulation (PCM) communications channel, comprising:
a timing recovery and equalization mechanism configured to correct sample timing and to reduce inter-symbol interference effects introduced by a PCM communications channel;
an inverter configured to invert a symbol from a series of reconstructed frames based on the state of a series of corresponding inversion bits;
a frame decoder configured to reconstitute a PCM symbol stream based on a frame selection decision; and
a symbol decoder configured to convert individual PCM symbols into a data bit stream.

20. A pulse coded modulation PCM modem communication system, comprising:
a frame -inversion encoder configured to receive an input after conversion from an analog signal on a pulse coded modulation (PCM) communications channel including
a symbol encoder configured to covert incoming data into a stream of PCM symbols,
a framing mechanism configured to group the stream of PCM symbols into a plurality of predetermined frame types,
an inversion-decision mechanism communicating with the framing mechanism and configured to dynamically select particular frames and to invert substantially all symbols of the selected frames according to an objective function, and an output configured to output a signal to a digital communications channel and to convert the output PCM symbol stream to an analog stream; and a frame-inversion decoder configured to receive an input after conversion from an analog signal on a communications channel, the frame inversion decoder including a timing recovery and equalization mechanism to correct sampling timing and to remove inter-symbol interference effects introduced by the communications channel, an inverter configured to invert substantially all of symbols of each of a series of reconstructed frames based on the state of a series of corresponding inversion bits, a frame decoder configured to reconstitute a PCM symbol stream based on a plurality of frame selection decisions, and a symbol encoder configured to convert individual PCM symbols into a data bit stream.

21. A frame inversion encoder for use with a pulse coded modulation (PCM) modem, comprising:

a symbol encoder configured to convert an incoming datastream into a PCM symbol stream;

a frame encoder configured to group the PCM symbol stream into a plurality of predetermined frame types; and a frame inverter configured to invert substantially all symbols within a particular frame according to a predetermined function to produce an encoded PCM symbol stream.

22. A decoding method for decoding a signal created by a method of spectral shaping for a PCM communications system, comprising the steps of:

receiving a stream of data;

receiving a first frame from the stream of data; and decoding the first frame by:
  determining inversion information and frame type information;
  inverting according to the inversion information;
  recovering a symbol from the first frame using the frame type information; and
  decoding the recovered symbol.

23. A decoding method according to claim 22, wherein the frame includes a plurality of symbols, the method further comprising receiving one bit of inversion information indicating whether to invert the frame of symbols; and receiving frame type information for indicating which sign bits of the plurality of symbols are to be inverted.

24. A decoding method according to claim 23, wherein the frame type information dictates that the sign bits of the plurality of symbols are to be inverted according to no sign bits, all sign bits, only odd sign bits or only even sign bits, and wherein decoding further includes inverting the sign bits of the symbols of the frame according to one of the following:

passing the frame through without inversion;
inverting each sign bit of all symbols in the frame;
inverting sign bits of only odd-numbered symbols in the frame; and
inverting sign bits of only even-numbered of symbols in the frame.

25. A decoding method for decoding a signal created by a method of spectral shaping for a PCM communications system, comprising the steps of:

receiving a stow of data;

receiving a first frame from the stream of data that includes a plurality of symbols;

receiving one bit of inversion information indicating whether to invert the frame of data;

receiving symbol information that dictates that sign bits which are included in the plurality of symbols are to be inverted according to all sign bits, only odd sign bits or only even sign bits; and decoding the first frame by:
  determining inversion information and frame type information;
  inverting the sign bits of the symbols of the frame according to one of the following:
    simply passing the frame rough without inversion;
    inverting each sign bit of all symbols in the frame;
    inverting sign bits of only odd-numbered symbols in the frame; and
    inverting sign bits of only even-numbered of symbols in the frame; and
  recovering a symbol from the first frame using the frame type information.

26. A frame-inversion decoder having an input for receiving a digital input after conversion of a signal from an analog signal to a communications signal on a communications channel; the decoder further including a timing recovery and equalization mechanism configured to correct sampling timing and to remove inter-symbol interference effects introduced by e communications channel, an inverter for inverting sign bits, which are associated with the symbols, of up to substantially all of the symbols of each of a series of reconstructed frames based on their respective states, and a frame decoder for reconstituting a PCM symbol stream based on a plurality of frame selection decisions.

27. A frame-inversion decoder having an input for receiving a digital input after conversion of a signal from an analog signal to a communications signal on a communications channel; the decoder further including a timing recovery and equalization mechanism configured to correct sampling timing and to remove inter-symbol interference effects introduced by the communications channel, an inverter for inverting sign bits, which are associated with the symbols, of up to substantially all of the symbols of each of a series of reconstructed frames based on the state of a series of corresponding inversion bits, a frame decoder for reconstituting a PCM symbol stream based on frame selection decisions, and a symbol decoder for converting individual PCM symbols back into a data bit stream.

* * * * *